(12) United States Patent
Angiolillo et al.

(10) Patent No.: US 8,799,944 B2
(45) Date of Patent: Aug. 5, 2014

(54) SYSTEM AND METHODS FOR REAL-TIME ACCESS TO MOVIE INFORMATION

(75) Inventors: Joel Stephen Angiolillo, Weston, MA (US); Xi Zhang, Newton, MA (US)

(73) Assignee: Verizon Services Corp., Ashburn, VA (US)

( * ) Notice: Subject to any disclaimer, the term of this patent is extended or adjusted under 35 U.S.C. 154(b) by 1560 days.

(21) Appl. No.: 11/483,870

(22) Filed: Jul. 10, 2006

(65) Prior Publication Data
US 2008/0022300 A1 Jan. 24, 2008

(51) Int. Cl.
*H04N 5/445* (2011.01)

(52) U.S. Cl.
USPC ............................................. 725/35; 725/40

(58) Field of Classification Search
CPC ............... H04N 21/25841; H04N 21/4525
USPC .......................... 725/40, 42, 34, 35
See application file for complete search history.

(56) References Cited

U.S. PATENT DOCUMENTS

| 7,111,318 | B2 * | 9/2006 | Vitale et al. | 725/107 |
|---|---|---|---|---|
| 2002/0042914 | A1 * | 4/2002 | Walker et al. | 725/36 |
| 2002/0046401 | A1 * | 4/2002 | Miyazaki et al. | 725/32 |
| 2002/0147984 | A1 * | 10/2002 | Tomsen et al. | 725/109 |
| 2003/0213001 | A1 * | 11/2003 | Yuen et al. | 725/136 |
| 2005/0278750 | A1 * | 12/2005 | Grossman et al. | 725/62 |
| 2006/0062363 | A1 * | 3/2006 | Albrett | 379/101.01 |
| 2007/0294721 | A1 * | 12/2007 | Haeuser et al. | 725/34 |

* cited by examiner

*Primary Examiner* — Nasser Goodarzi
*Assistant Examiner* — Hyun Hong (57) ABSTRACT

Systems and methods are disclosed for providing real-time access to movie information to viewers in an interactive television viewing system. During select times when viewing a program on a television, the viewer is presented information, typically an advertisement, regarding a movie available for viewing in a movie theater. The viewer can opt to review supplemental information regarding the movie, including information directed to the actors, plot, rating, and where and when it is showing relative to the viewer's location. The viewer can opt to purchase tickets as well. The system can be controlled in one embodiment by the user interacting with a set top box sending signaling information to a processor in the network headend that retrieves the appropriate information for display to the viewer. The information can be provided to the set-top-box and displayed to the user using an overlapping window, or other techniques.

21 Claims, 5 Drawing Sheets

| Movie Code | Theater Identifier | Show Dates | Times | Contact Info |
|---|---|---|---|---|
| 12345 | 5565 | 5/1/05-5/14/05 | 1430; 1730; 2030 | (404) 555-1234 www.theaters12.com |
| 12345 | 7345 | 5/1/05-5/18/05 | 1600; 1800; 2000 | (404) 555-1212 www.megaplex48.com |
| 12346 | 4837 | ... | ... | ... |

*Figure 5*

SYSTEM AND METHODS FOR REAL-TIME ACCESS TO MOVIE INFORMATION

BACKGROUND INFORMATION

Television is a well known medium for advertising products and services. Compared to print and radio media, television is unique in its ability to convey video images to viewers. Thus, television is ideally suited for advertising theatrical-based movies to potential audience members. Television provides the ability for viewers to preview clips, called "trailers", of upcoming movies. In fact, the selection and development of such trailers is a highly developed craft designed to 'hook' audience members so as to see the movie.

Because many television channels are provided in a national or regional manner, movie advertisements are tailored to provide general information only about the movie. These ads do not typically indicate geographical specific information, such as where it is currently being shown. Because of the ephemeral nature of movie showings, movie advertisements cannot convey specific information about where and when the movie is currently playing. The serving area of the medium is too vast to effectively convey this type of information to television viewers. Further, because of the high cost of television advertising, the advertisement itself is designed to maximize interest in the movie, and limits the extent of details such as where and when the movie can be seen because doing so often would detract the viewer's interest in viewing a long list of theaters, dates, and times.

Consequently, after seeing the movie advertisement on television, viewers typically then consult another form of advertisement, such as a newspaper, which advertise the movie in local theaters with specific showing times. Further, viewers desiring further information on the content of the movie may consult other sources, such as movie reviews in magazines, and contained in other television programs. It is apparent that television advertising of a movie provides only a part of the information desired by a potential viewer. The viewer is typically required to consult other media for further information.

Therefore, a system and method is needed for providing real-time access to movie related information to television viewers of movie advertisements.

DETAILED DESCRIPTION OF PREFERRED EMBODIMENTS

The preferred embodiments implemented according to the present inventions now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Movies are often advertised using television as the medium. Television provides an ideal medium for presenting viewers with short samples of a movie, called "trailers" to potential viewers of the movie. These ads may be placed on national television networks, allowing a large segment of the television viewing audience to become aware of the movie. In other situations, advertisements may be placed in a regional cable network. Because of the high cost of television advertising, the trailers are carefully crafted to entice as many viewers as possible to see the movie.

In both situations, such advertisements are void of local availability information. Because of the geographical coverage of television, it is difficult to convey details about when and where the movie can be viewed. Typically, movies may be available at various theater locations for a few weeks, and it is difficult to convey timely and accurate information to the viewers in a large distribution area without editing the commercial. Thus, potential movie viewers typically consult another medium of advertising, such as newspapers to learn where and when a particular movie is playing.

Other viewers upon learning of a new movie may be motivated to learn more information about the movie itself, including the actors, directors, plot, critic's reviews, etc. They can typically obtain only limited information of these aspects from a movie trailer, and may consult other sources, such as on-line critic's reviews, newsprint reviews, etc.

Finally, viewers motivated to attend the movie may be motivated to purchase tickets by calling a particular theater to learn whether tickets are available, and purchase tickets or reserve seats. This may require consulting a telephone book for the telephone number. Because there is typically a time-gap between any of these activities (e.g., viewing the advertisement, seeking out a critic's review, seeking a local advertisement, and calling the theater), the process is inefficient and time consuming.

Interactive television systems (ITS) provide the opportunity to collapse these activities into a seamless experience. Interactive television systems can be based on a variety of technologies, including fiber, hybrid fiber/coax, and wireless. The embodiments disclosed herein are only one of various methods that can be used, and the principles of the present invention are largely independent of the type of interactive technology used by a ITS provider. Although not limited to cable-based technology, this is used as an illustrative embodiment.

Figure 1:
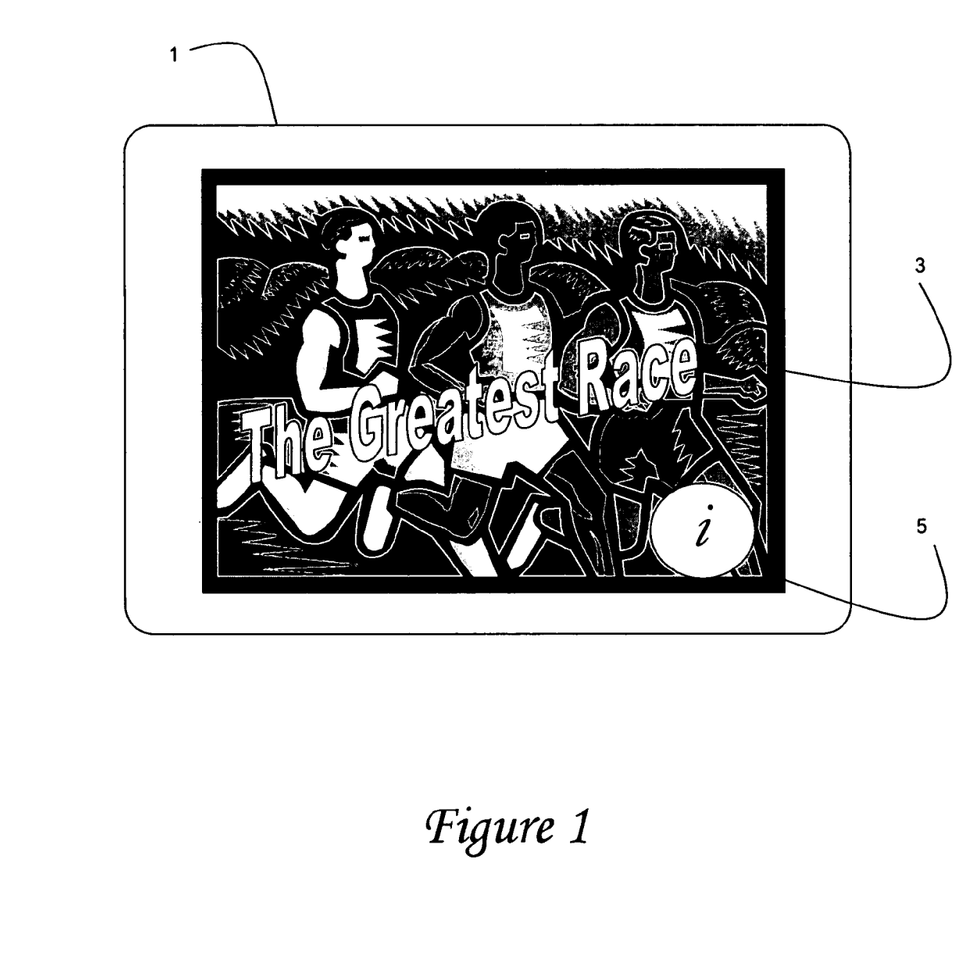
FIG. 1 illustrates one embodiment of a television advertisement presented to a viewer allowing real-time access to movie information.

FIG. 1 illustrates one embodiment of a system that facilitates television viewers obtaining real-time movie information. FIG. 1 illustrates a television set 1 displaying an image 3, which is an advertisement for a movie. Although the nature of the advertisement is not critical, in the present embodiment, a sample of the movie (e.g., a trailer) is being shown. In the present embodiment, the movie is entitled "The Greatest Race" and scenes are displayed the video image 3 presented to the viewer. In addition, in some embodiments the video image will incorporate the display of an icon 5 alerting the viewer that additional information is available via the interactive television system. The icon 5 illustrated here is shown as a circle surrounding the letter "i", which stands for "information." The ITS provider may educate its viewers that the icon indicates that further information is available in real-time. The icon may be translucent, and inserted in advertisements by the ITS provider or other source where appropriate so that viewers will not have to guess via trial-and-error when additional information is available for a particular advertisement.

Typically, the viewer will indicate via a remote control that further information is desired. The viewer can make known their desire while the advertisement is being played, or while the icon is present. Because of the possibility of sequential ads being presented on a channel that allow real-time information, the request for information is typically based on the current advertisement shown (e.g., it is real-time). Thus, any time a request is made, it is temporally related to the advertisement currently presented on the channel selected and viewed by the viewer.

Figure 2:
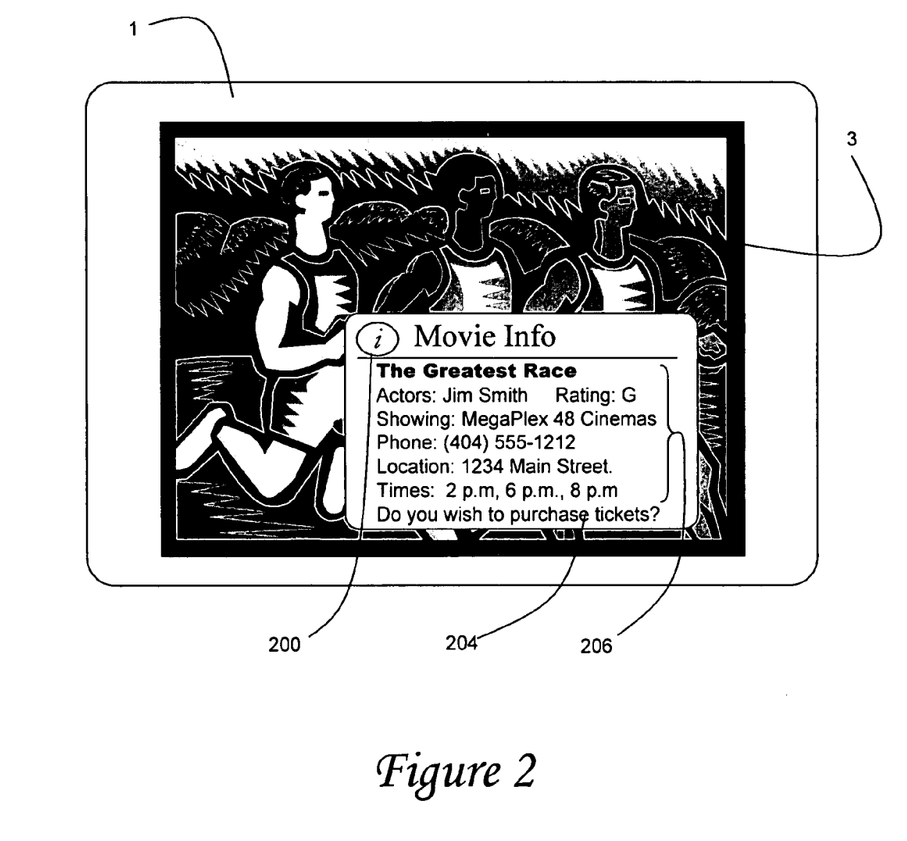
FIG. 2 illustrates one embodiment of real-time movie information provided to a viewer.

After requesting further information, the viewer may be presented an image depicted in FIG. 2. In FIG. 2, the television 1 may continue to present the advertisement video image 3. However, an information window 204 is overlayed on the video. The information window may include the icon 200 to inform the viewer that this window is not part of the regular video, nor a window associated with the television or set top box management functions. The information window may comprise a variety of information. The embodiment shown depicts information 206 pertaining to the movie title, its actors, movie rating, closest playing theater and its phone number, and show times. In addition, the information window maybe interactive, providing a prompt to the viewer for purchasing tickets.

The generation of the information window can be done in several ways. Typically, the window is overlayed on the video image. Alternatively, a 'picture-in-picture' technique can be used, as well as a split screen presentation. The window is typically generated by the set-top-box, and means for doing so are well known in the art.

The contents of information presented in the window can vary. Information can be presented on a single page, or multiple pages allowing the user to scroll through various pages. Menus can be defined, allowing the user to select (typically with the remote controller) categories of additional information, such as "closest showing locations", "movie critiques", "other recent movie releases", etc. Thus, display structures can be defined similar to those defined in interactive web-pages. In fact, in one embodiment the information windows are created using HTML based constructs. This effectively provides a web-page overlayed on a video image.

The user typically uses the remote control, which may have a cursor control capability, to select an option. Selection an option may result in presenting the viewer with another information window. In FIG. 2, when the cursor (not shown) is positioned over the last line (which states "Do you wish to purchase tickets?"), and the user presses an appropriate key on the remote, the system recognizes this as an affirmative indication that tickets are desired to be purchased. Alternatively, a variety of other icons for indicating the invocation of the function are possible, including menu selections, radio buttons, etc. In general, any of the well known HTML, XML, or JAVA based mechanisms used in web-page design can be employed.

The presentation of an icon during selected advertisements indicates the viewer can request additional information, which is then presented to the viewer using a separate information window. While one embodiment is based on the user navigating the options in the information window using the remote control cursor control, other embodiments can use a keyboard for the user to enter specification information. These variations will become evident in light of the following discussion of the system components.

System Components

Figure 3:
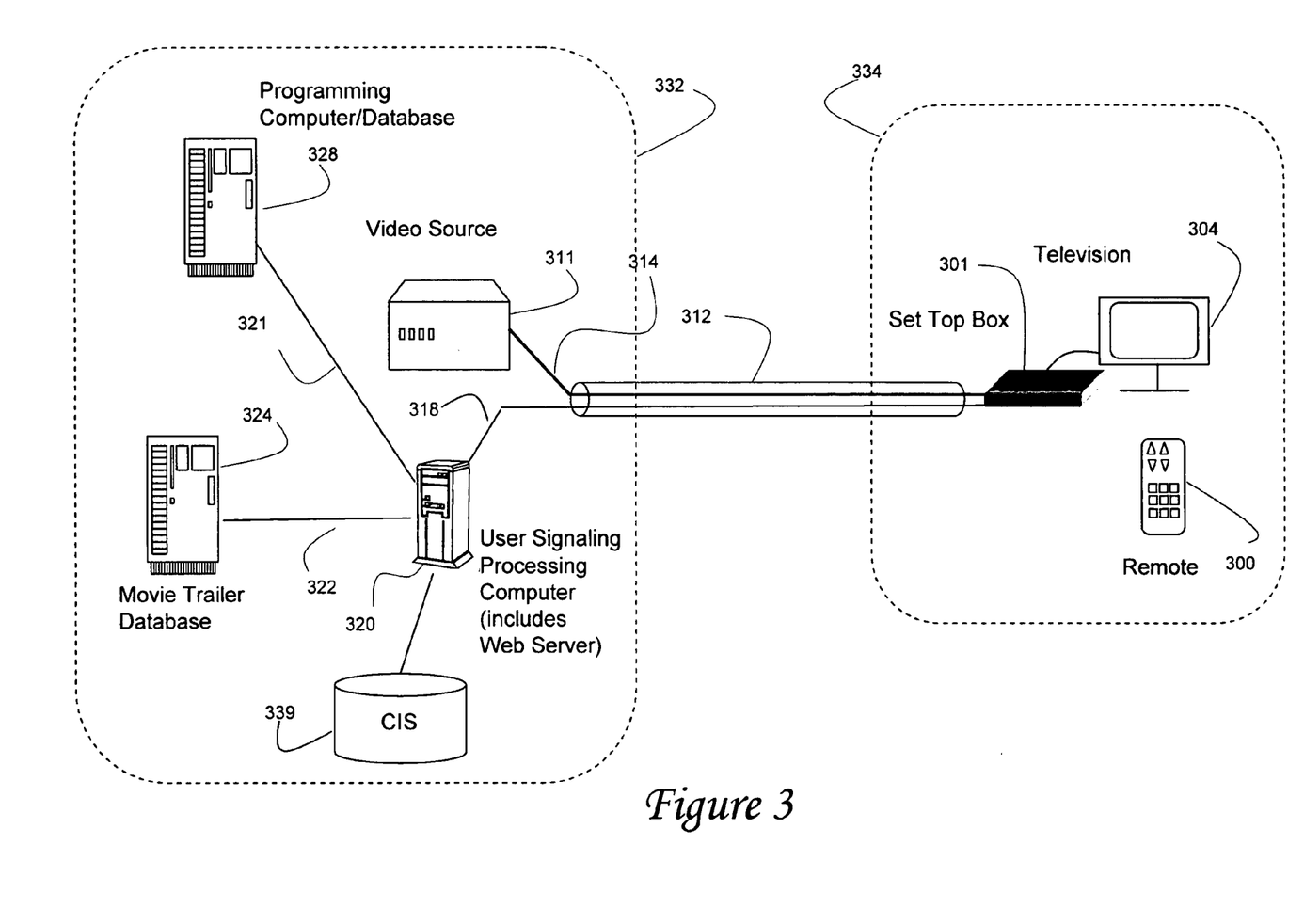
FIG. 3 illustrates another embodiment of a system for providing real-time movie related information to a viewer of an advertisement.

FIG. 3 illustrates one embodiment of a system for providing real-time movie information to a viewer in an interactive television system. Those skilled in the art will appreciate that a variety of architectures are possible, and FIG. 3 illustrates only one of several possible embodiments. In FIG. 3, there are two main portions that are involved—the viewer's premise 334 and the ITS system provider 332. The viewer's premise is typically a residential location, and comprises a television 304, such as a high definition digital television, which receives its signals from a set-top-box 301 that provides video signals in appropriate format to the television. The set-top-box may have a variety of interfaces, and can incorporate other functionality, such as a DOCSIS modem. The remote controller 300 ("remote") is used by the viewer to control the set-top-box, as well as potentially the television. In this embodiment, the remote contains a cursor control or selection keypad, typically allowing a cursor or selection to be indicated via indications of "up", "down", "left" and "right." In addition, certain generic function keys maybe defined (e.g., function key #1, function key #2, etc.) The function associated with these keys may be context specific—e.g., depending on the particular information page being viewed.

The set-top-box terminates a network interface, represented as a communication facility 312. This represents a logical simplification, as the actual communication facility may be based on fiber-optic SONET rings, co-axial drops to the residence, opto-electric converters, multiplexers, etc. However, for purposes of illustrating the present invention, a simple bi-direction high speed digital facility is represented.

The set-top-box 301 is shown as involving two logical connections on the communication facility 312. The first connection 314 represents video information delivered to the set-top-box. This may be a variety of video channels coded in MPEG form that are selected by the set-top-box for display to the television based on the current channel selected by the viewer. Alternatively, the first connection 314 could represent a particular video channel (such as a pay-per-view channel) or other switch channel. The first communication facility is shown as receiving its video information for a video source 311. Although the video source could be thought of as the cable headend equipment, this is not necessarily a limitation. In any case, signals are provided from a video source 311 over the facility 314 to the set-top-box 301 representing a program which is presented to the viewer on the television 304 based on a channel selected by the viewer.

The other portion of the system is the ITS system provider 332. This comprises a video source 311 that provides various video channels 314 over to the set-top-box. The system 332 also comprises a user signaling processing computer 320 ("signaling processor") that interacts with the set-top-box 301. The signaling processor interacts with three other systems in the ITS system provider. First, the signaling processor may access a customer information system (CIS) 339. The CIS contains information regarding a given customer (e.g., viewer), and knows the geographical location of the viewer/set-top-box. Specifically, the CIS knows the address of the viewer's premises 334. The CIS may provide the location information to the signaling processor 320, which is required to perform a geographical match of the closest available movie theater showing the movie. Typically, this may be done by indicating a zip code of the residence. Although the CIS is shown as a separate database, it may be integrated with the signaling processor 320, or 'tightly coupled' via a communications intranet operated by the ITS system provider. Various approaches are possible and intended to be within the scope of the present invention.

The signaling processor can also communicate with a movie trailer database 324. This system contains various movie related information, such as movie trailer clips, a directory of theaters currently showing a given movies, each show times, and contact information. In summary, any information pertaining to the movie information that is required by the signaling processor is obtained from the movie trailer database. This may be a national or regional database, and may be operated by a third party, such as an association affiliated with movie theaters that gathers, organizes, and updates information regarding movie theaters showings.

Finally, the signaling processor 320 may communicate with a programming computer 328. The programming computer operates as a database and contains information regarding currently presented programs and their associated channels from the video source. The term "program" is to be broadly construed to include any form of video asset, and thus includes televisions programs, advertisements, commercials, public service announcements, etc. (The "programming" in the term "programming computer" does not mean a application programming language or the act of developing an application program.) At any given time, the programming computer can associate a program (e.g., video asset) with a particular channel in real time. Thus, if the user signaling processor needs to know what program (e.g., movie commercial) is currently being viewed on channel five by a particular viewer in a particular cable system, the programming computer can provide that information to the signaling processor. Typically, the programming computer contains data for various cable systems, so that to determine the content of a particular program at a given time, not only is the channel identifier required, but also the video source or cable system. This is because a given channel (e.g., channel 5) may have different programs currently being delivered in different cable systems. Thus, a cable system or equipment identifier may also be included in the request to identify the correct program.

Although the signaling processor 320 is disclosed as communicating directly with the CIS database 339, the movie trailer database 324, and the programming computer 328, the communication may occur using the Internet, extra-nets, private lines, etc. having intervening routers, multiplexers, and other equipment. The various systems may be remotely located and serve a specific geographical or logical serving area. For example, the programming computer database may logically serve a portion of a single ITS system provider. The CIS database may serve a single ITS system provider. Typically, the movie trailer database would serve numerous ITS system providers on a national or regional basis.

Figure 4:
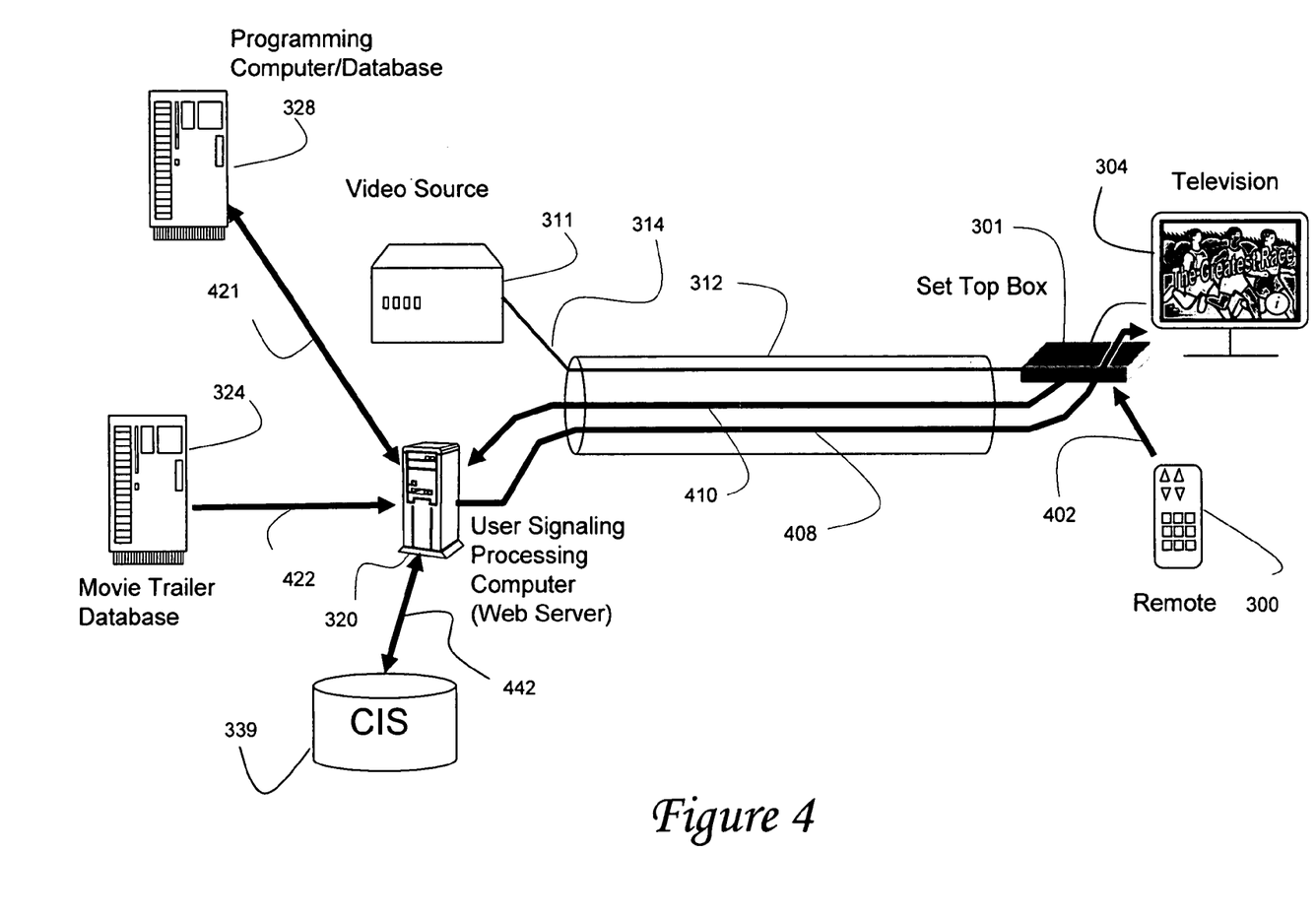
FIG. 4 illustrates one embodiment of an information flow for providing real-time movie information to a viewer.

FIG. 4 illustrates a flow of events associated with providing real-time movie information to the viewer. The process starts with the viewer observing an advertisement on the television 304 depicting a movie advertisement, such as that shown in FIG. 1. This video image present is based on a previously selected channel by the viewer for viewing. The set-top-box 301 receives the video signals 314 conveyed on the facilities 312 from the video source 311 operated by the ITS system provider. In this embodiment, the television displays the icon signifying that real-time supplement information can be obtained for the currently displayed program or commercial.

The viewer opts to obtain the supplemental information using the remote controller 300. The controller in this embodiment controls the set-to-box, although other embodiments may integrate the set-top-box controller in the television, thereby allowing the viewer to interact with the television. The remote has means for indicating a request for supplemental information, either by the viewer pressing a dedicated function key, or entering a special series of keypad depressions (e.g., a unique access code).

The set-top-box 301 upon receiving the information request for supplemental information, sends a message on the communication link 410. This message typically is an application layer specific protocol message conveyed using a TCP-IP connection between the set-top-box and the user signaling processor. However, the nature and format of the signaling message can be of various forms, but by itself indicates that a request for supplemental information is being made. The message typically conveys an indication of the channel from the set-top-box currently selected by the user for viewing. Thus, the line 410 conveying this is shown in FIG. 4 as going from the set-top-box to the signaling processor. However, this does not preclude acknowledgement or messages being transferred in the other direction.

The signaling message from the set-to-box may also contain a set-top-box identifier or address. If the establishment of the signaling link between the set-top-box and the signaling processor previously created an association between the two so that the signaling processor knows the identify of the set-top-box, then this address information is not required. However, typically the set-top-box does identify itself by conveying an explicit address in the request. One embodiment of the identifier is an IP address, although other forms are within the scope of the invention.

Assume that the channel five is currently selected for viewing and that channel has the movie advertisement being displayed. The signaling processor receives the request for supplemental information in a message indicating that: 1) a viewer from an identified set-top-box has requested information, and 2) the set-to-box is currently selected to channel five.

The signaling processor 320 may perform several functions in parallel or serial. For sake of illustration, a serial process is described. The signaling processor 320 consults the CIS database 339 using the set top box identifier to ascertain the viewer's location. In certain ITS systems, a variety of cable systems may be served by a single CIS system. The set-top-box is associated with a specific customer location, so that given the set-top-box identifier, the serving location of the viewer is readily known. This information is returned to the signaling processor by the CIS system.

Next, the signaling processor uses the channel information to ascertain what program (or specifically, which movie advertisement) is being viewed by that viewer. In this case, it is necessary to know which cable system or video source the viewer is associated with. The signaling processor provides the programming computer 328 with information regarding the video source (or other suitable equipment or cable system identifier) and the channel number. The information regarding the video source could be known a priori by the signaling processor, or another database (such as the CIS) could have provided this information to the signaling processor. In any case, it is presume that the programming computer knows all the current programs (including specifically movie commercials) being provided at any time on a channel. The programming computer responds to the request of the signaling processor with a "tag" or identifier associated with the particular advertisement. The tag or identifier may actually be an identifier of the subject matter of the advertisement, and could also take the form of an URL or other form of an address to which requests for the additional information are to be directed to.

The signaling processor now knows the particular advertisement (or at least a tag for identifying it to the movie trailer database) for which the viewer desires further information. The signaling processor next retrieves the information regarding the movie trailer. Typically, this is accomplished by generating an HTML, XML, or similar based protocol to the movie trailer computer using a defined URL address, so that the appropriate information can be downloaded. The indication of which movie trailer is requested can be accomplished at least two ways.

In one embodiment a common URL is used by the signaling processor to generate the request for supplemental information. This request indicates the identifier or tag associated with the particular movie. This requires the signaling processor to know the movie identifier, which was provided to the signaling processor by the programming computer. The identifier or tag for a particular movie would have to be commonly understood by the programming computer and the movie trailer computer. For example, if the programming computer returns a movie identification code="12345" identifying the movie "The Greatest Race" to the signaling processor, then when the signaling requests movie information from the movie trailer computer, the signaling processor will indicate the same movie identification code "12345". The signaling processor will typically also include a geographical indicator, allowing the movie trailer computer to select the appropriate movie theater and times for the viewer's location. Typically, a zip code associated with the viewer's residence is used. Thus, the movie trailer computer will search its database for the appropriate theaters showing "The Greatest Race" within a certain defined distance from that given zip code. This type of interaction can be done using established HTML, XML, JAVA script, or other such protocols.

Alternatively, the signaling processor may launch a query to the movie trailer database, using a previously established URL that is specific to the movie advertisement. In this case, the complete and detail URL may be returned by the programming computer system to the signaling processor. Similar to as discussed above, the signaling processor would also provide a geographical indicator. In essence, the indication of the program (e.g., the "tag" or "identifier") can be functionally incorporate in the address for sending the request, or in an application level dialog in the request to a generic address. Other variations are possible, such as consulting a directory server for ascertaining the appropriate address. These and other variations are intended to be within the scope of the present invention.

Figure 5:
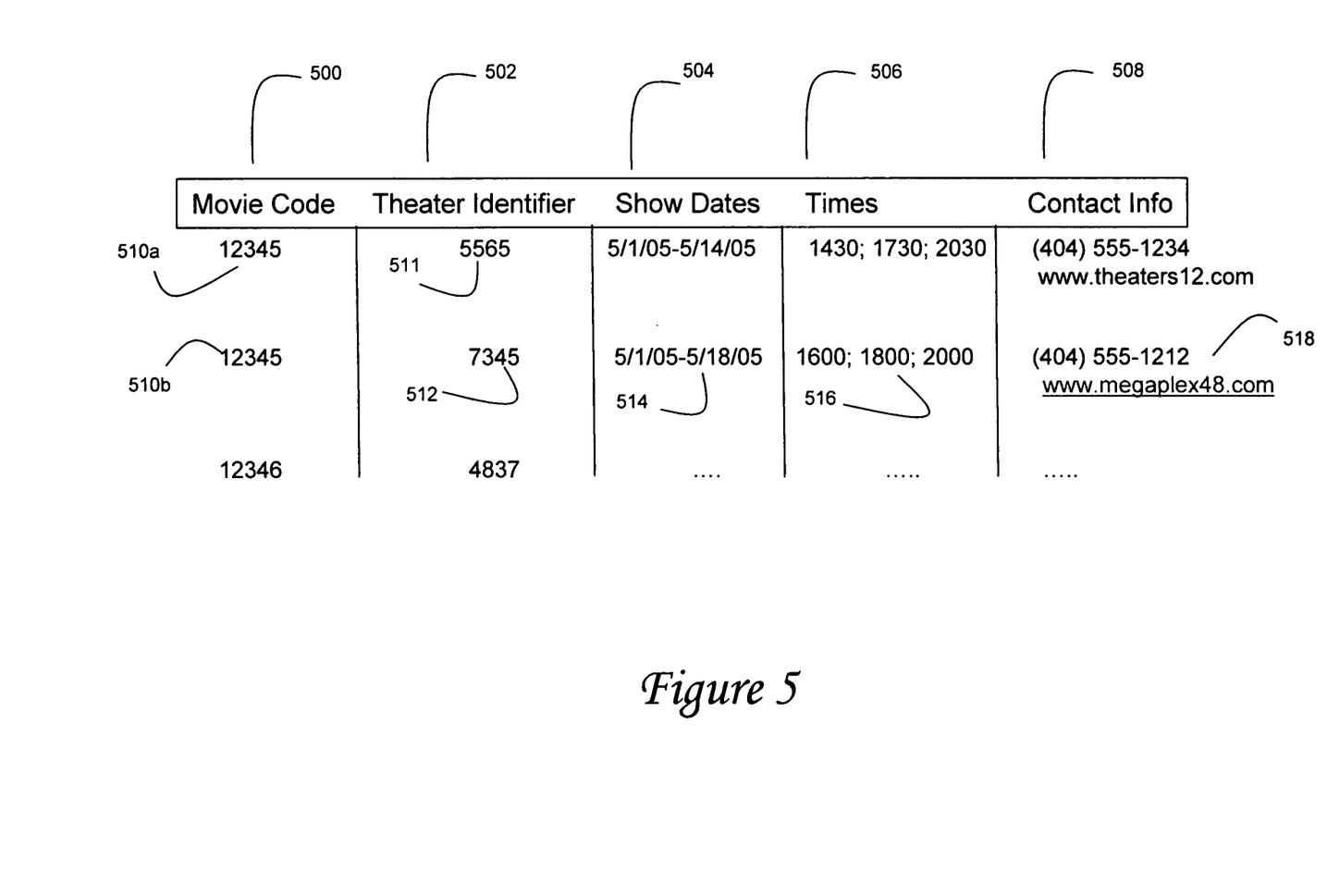
FIG. 5 illustrates one embodiment of a data structure in a database for providing real-time movie information to a viewer.

The movie trailer database contains various types of information regarding the movie, including video trailers (typically stored in MPEG format), affiliated theaters, critic's reviews, ratings, plot summaries, etc. The exact scope and form of information retained by the movie trailer database may vary, and FIG. 5 illustrates one embodiment. FIG. 5 is a simplified database, designed to illustrate the principles of the invention. FIG. 5 is predicated on the signaling processor sending the request for the movie information to an address wherein the address does not indicate the particular movie—e.g., an identifier is provided separate from the URL. In this embodiment, the movie advertisement is identified via a tag or explicit identifier.

In FIG. 5, the database comprises a plurality of records, which are typically indexed via a movie code 500. The movie code can be an arbitrary number, or can have structured identified within it, such as identifying the film studio, rating, etc. In this example, the movie codes are an arbitrary number indexed in numerical order.

Each movie code is associated with one theater identifier 502, although typically there may be dozens or hundreds of theaters playing that particular movie. The theater identifier can be used as a shorthand identifier for a particular movie theater, and can be used to access a separate file containing particular information, such as the geographic location of the theater. Alternatively, the theater identifier may have an implied geographical structure—e.g., the first two numbers identify a state, city or zip code. This would allow rapid isolation of potential theaters in an areas associated with the viewer.

The theater identifier can also be used to provide information to the viewer regarding other movies available at that theater. Thus, by returning other movie codes associated with the same theater, other options for movies may be presented to the viewer.

Next, a "Show dates" field 504 indicates when that particular movie is showing at the theater and a "times" field 506 indicates when that particular movie is scheduled for playing at the particular theater. Typically, the time value is presented in a 24 hour format, hence a value of 1800 would correspond to 6:00 p.m. local time. Finally, a "contact info" field 508 is provided with a telephone number and web page address for that theater. Recall that other information is typically stored, including ratings, reviews, etc., but are not illustrated for sake of clarity.

Returning to our example, assume that the signaling processor requests information for movie code "12345" for a certain geographical location (identified by zip code, for example). The database would search for movie codes "12345". In FIG. 5, there are two entries 510 that are identified. Since a typical movie maybe playing at hundreds of theaters nationally, there may be hundreds of theater identifiers shown. In this case, there are only two theater identifiers shown—"55565" 511 and "7345" 512. The database analyzes a geographical indication associated with each theater identifier. This could be stored in another database indexed by theater identifier that indicates a zip code location). The movie trailer database determines whether any of the listed theater codes is nearby to the desired location (typically, by doing a radius calculation, or some other algorithm for determining an acceptably nearby theater). Assume in this case that "5565" is too far away, and the database discards further consideration of this theater. However, assume that "7345" 512 is within an acceptable distance. The database retrieves the show dates 514, times 516, and contact information 518 and provides the information in a response to the signaling processor. This response can be formed using well know protocols, such as HTML.

The database may also store MPEG (or other format) trailers that can be downloaded or streamed in real time to the signaling processor. A host of other related information can be provided, including movie reviews, ratings, directions to theater, ticket prices, etc. Those skilled in the art will appreciate that various files and structures can be used and inter-linked to provide a variety of information upon request.

Returning to FIG. 4, the movie trailer database 324 returns the appropriate movie information to the signaling processor.

The signaling processor may cache the information, process it, and return a portion of the data via connection 408 to the set-top-box 301. The signaling processor may also instruct the set-top-box with commands regarding the presentation, format, and handling of the data as well.

The set-top-box then creates a window and displays the data as instructed. The result is that the set-top-box creates a window overlayed on the video image as shown in FIG. 2.

The windows presented to the viewer can be categorized as "active" or "passive." A "passive" window is largely informational, in that information is presented to the viewer without soliciting any action. The viewer may still have limited interaction (e.g., scrolling to the next page, or linking to other pages). Other windows may invite interaction with the viewer, and are considered as "active." For example, the window in FIG. 2 could be largely informational, but it does invite the viewer to purchase tickets and enter into a transaction. Assuming the viewer indicates they wish to purchase tickets, the set-top-box may replicate some of the information flows in FIG. 4. Specifically, the set-top-box would relay the request over connection 410 to the signaling processor 442, where the signaling processor may then interact with the CIS 339 to determine a credit rating or authorization that the viewer is allowed to complete the transaction. The signaling processor may use the URL of the movie theater's web page to consummate the transaction directly (FIG. 4 does not show the signaling processor interacting with movie theater's web page.)

Further extrapolations are possible, such as the signaling processor prompting the user to enter a credit card number, and then transmitting it to the movie theater's web page. Alternatively, the signaling processor could allow another window to be opened up on, which is directly linked to the movie theater's web page.

The user may interact with the window using the remote control to navigate and select options. Other embodiments may utilize a keyboard for input, allowing the user to input text (which can be done using the handheld remote, although it is typically slower).

Although the aforementioned embodiment has been disclosed using movie information as an example, the present invention is not limited to providing real-time movie information, but can be applied to other programs, such as commercials. This allows the source of the commercial (be it service provider, retailer, manufacturer) to provide an indication via an icon for a viewer to request supplemental information in real time, including: learning of the closest retailer, investigating special promotions, entering contests, etc.

That which is claimed:

1. A method comprising:
providing a video signal to a set-top-box for display on a television to a viewer, the video signal conveying an advertisement to the viewer, the video signal further conveying an indication that supplemental information is available regarding the advertisement;
receiving a first request for the supplemental information at the set-top-box;
generating a second request for the supplemental information regarding the advertisement from the set-top-box to a processor wherein the second request for the supplemental information further comprises a set-top-box identifier and a channel identifier indicating a currently selected display channel;
accessing a first database by the processor using the set-top-box identifier included in the second request for the supplemental information to determine a geographical location associated with the set-top-box;
accessing a second database, remote from the set-top-box, by the processor using the channel identifier included in the second request for the supplemental information to retrieve, in response to the second request for supplemental information, data identifying the advertisement that is being displayed when the first request for the supplemental information is received at the set-top-box;
using, by the processor, the geographic location accessed from the first database and the data identifying the advertisement accessed from the second database to launch a third request for supplemental information to a third database;
receiving, by the processor, the supplemental information from the third database in response to the third request;
transmitting, from the processor to the set-top-box, at least a portion of the supplemental information received from the third database; and
generating a second video signal conveying the supplemental information.

2. The method of claim 1 wherein the indication that supplemental information is available regarding the advertisement is an icon overlayed on a video image.

3. The method of claim 1 wherein the step of receiving a first request for the supplemental information at the set-top-box is generated by a viewer operating a wireless remote controller.

4. The method of claim 1 wherein the geographical location associated with the set-top-box is based on a zip code of the viewer's residence.

5. The method of claim 1 wherein the step of accessing a second database by the processor using the channel identifier to retrieve the data identifying the advertisement involves accessing the second database by the processor using the channel identifier and an equipment identifier to identify the advertisement.

6. The method of claim 1 wherein the advertisement pertains to a movie advertisement.

7. The method of claim 1 wherein the supplemental information further comprises a URL of a web page associated with subject matter associated with the program.

8. The method of claim 1 wherein the accessing of the second database by the processor further comprises using information specifying a video source associated with the set-top-box, together with the channel identifier, to retrieve the data identifying the advertisement being displayed for viewing by the set-top-box when the first request for the supplemental information is received at the set-top-box.

9. The method of claim 5 wherein the equipment identifier indicates a video source providing the video signal conveying the advertisement to the set-top-box.

10. The method of claim 6 wherein the supplemental information includes a name of a theater showing a movie associated with the movie advertisement.

11. The method of claim 10 wherein the supplemental information further comprises a time associated with the showing of the movie.

12. A system comprising:
a set-top-box capable of generating and providing video signals associated with an advertisement for display of the advertisement, the set-top box further capable of receiving a first request for supplemental information regarding the displayed advertisement and generating, in response to the first request, a second request for supplemental information regarding the displayed advertisement, wherein the second request for the supplemental information regarding the displayed advertisement comprises a set-top-box identifier and a channel identifier associated with a selected display channel, the set-top-box further capable of receiving the supplemental information and generating a second video signal comprising a window displaying the supplemental information;

a communication network capable of transmitting the second request for supplement information from the set-top-box;

a first database, remote from the set top box, capable of receiving a request for an advertisement identifier based on in part the channel identifier included in the second request for the supplemental information, the first database retrieving, in response to the request for the advertisement identifier, the advertisement identifier associated with the displayed advertisement associated with the channel identifier;

a second database capable of receiving a request for a geographical location identifier based on in part the channel identifier and responding with the geographical location identifier;

a third database capable of receiving a third request for the supplemental information, the third request comprising the advertisement identifier; and a processor operatively connected to the communication network and configured to:
  receive the second request for the supplemental information,
  generate the request for the advertisement identifier from the first database and the request for the geographical identifier from the second database,
  launch the request for the advertisement identifier from the processor to the first database,
  receive, in response to the request for the advertisement identifier and from the first database, the advertisement identifier,
  launch the request for the geographical identifier from the processor the second database,
  receive, in response to the request for the geographical identifier and from the second database, the geographical identifier,
  use the advertisement identifier from the first database and the geographical identifier from the second database to generate the third request for the supplemental information to the third database,
  launch the third request for the supplemental information from the processor to the third database,
  receive the supplemental information from the third database in response to the third request, and
  transmit at least a portion of the supplemental information received from the third database to the set-top-box.

13. The system of claim 12 further comprising:
a remote controller capable of generating the first request for the supplemental information.

14. The system of claim 13 wherein the set-top-box is capable of generating the second video signal comprising a window displaying the supplemental information by overlaying the window on the image produced by the video signals associated with the advertisement.

15. The system of claim 13 wherein the communication network is a bi-directional cable network.

16. The system of claim 13 wherein the advertisement identifier is associated with a movie.

17. The system of claim 13 wherein the processor receives the geographical location identifier from the second database in the form of a zip code.

18. The system of claim 13 wherein the advertisement identifier identifies a product for sale.

19. The system of claim 16 wherein the supplemental information comprises theater information associated with showing the movie.

20. The system of claim 19 wherein the supplemental information further comprises a URL of the theater associated with showing the movie.

21. The system of claim 20 wherein the processor is further configured to receive a request to purchase movie tickets.

* * * * *